(12) United States Patent
Cartwright et al.

(10) Patent No.: US 9,858,936 B2
(45) Date of Patent: Jan. 2, 2018

(54) METHODS AND SYSTEMS FOR SELECTING LAYERS OF ENCODED AUDIO SIGNALS FOR TELECONFERENCING

(71) Applicants: DOLBY LABORATORIES LICENSING CORPORATION, San Francisco, CA (US); DOLBY INTERNATIONAL AB, Amsterdam Zuidoost (NL)

(72) Inventors: Richard James Cartwright, Killara (AU); Glenn Dickins, Como (AU)

(73) Assignees: Dolby Laboratories Licensing Corporation, San Francisco, CA (US); Dolby International AB, Amsterdam Zuidoost (NL)

(*) Notice: Subject to any disclaimer, the term of this patent is extended or adjusted under 35 U.S.C. 154(b) by 0 days.

(21) Appl. No.: 14/421,419

(22) PCT Filed: Sep. 11, 2013

(86) PCT No.: PCT/US2013/059295
§ 371 (c)(1),
(2) Date: Feb. 12, 2015

(87) PCT Pub. No.: WO2014/046944
PCT Pub. Date: Mar. 27, 2014

(65) Prior Publication Data
US 2015/0221319 A1 Aug. 6, 2015

Related U.S. Application Data

(60) Provisional application No. 61/703,857, filed on Sep. 21, 2012, provisional application No. 61/703,861, (Continued)

(51) Int. Cl.
*G10L 19/012* (2013.01)
*G10L 19/008* (2013.01)
(Continued)

(52) U.S. Cl.
CPC .......... *G10L 19/012* (2013.01); *G10L 19/008* (2013.01); *G10L 19/0208* (2013.01);
(Continued)

(58) Field of Classification Search
CPC ....... G10L 19/24; G10L 19/012; G10L 19/22; G10L 19/008; G10L 19/02;
(Continued)

(56) References Cited

U.S. PATENT DOCUMENTS

| 4,949,383 A | 8/1990 | Koh |
| 5,651,090 A | 7/1997 | Moriya |

(Continued)

FOREIGN PATENT DOCUMENTS

| EP | 1873753 | 1/2008 | | |
| NL | WO 03090207 A1 | * 10/2003 | .......... | G10L 19/008 |

(Continued)

OTHER PUBLICATIONS

Tzagkarakis, C. et al "A Multichannel Sinusoidal Model Applied to Spot Microphone Signals for Immersive Audio" IEEE Transactions on Audio, Speech and Language Processing, v. 17, No. 8, p. 1483-1497, Nov. 2009.

(Continued)

*Primary Examiner* — Brian Albertalli (57) ABSTRACT

In some embodiments, a method for selecting at least one layer of a spatially layered, encoded audio signal. Typical embodiments are teleconferencing methods in which at least one of a set of nodes (endpoints, each of which is a telephone system, and optionally also a server) is configured to perform audio coding in response to soundfield audio data to generate spatially layered encoded audio including any of a number of different subsets of a set of layers, the set of layers including at least one monophonic layer, at least one soundfield layer, and optionally also at least one metadata layer (Continued)

comprising metadata indicative of at least one processing operation to be performed on the encoded audio. Other aspects are systems configured (e.g., programmed) to perform any embodiment of the method, and computer readable media which store code for implementing any embodiment of the method or steps thereof.

15 Claims, 2 Drawing Sheets

Related U.S. Application Data filed on Sep. 21, 2012, provisional application No. 61/703,855, filed on Sep. 21, 2012.

(51) Int. Cl.

| | | |
|---|---|---|
| *G10L 19/02* | (2013.01) | |
| *H04M 3/56* | (2006.01) | |
| *G10L 21/0208* | (2013.01) | |
| *G10L 19/032* | (2013.01) | |
| *G10L 19/24* | (2013.01) | |
| *G10L 19/22* | (2013.01) | |
| *G10L 21/02* | (2013.01) | |
| *G10L 21/0216* | (2013.01) | |

(52) U.S. Cl.
CPC ............ *G10L 19/032* (2013.01); *G10L 19/22* (2013.01); *G10L 19/24* (2013.01); *G10L 21/02* (2013.01); *G10L 21/0208* (2013.01); *H04M 3/56* (2013.01); *G10L 19/02* (2013.01); *G10L 21/0216* (2013.01)

(58) Field of Classification Search
CPC ............ G10L 19/0206; G10L 21/0216; G10L 21/0208; G10L 19/032; G10L 21/02; H04M 3/56
See application file for complete search history.

(56) References Cited

U.S. PATENT DOCUMENTS

| | | | |
|---|---|---|---|
| 5,815,097 A | 9/1998 | Schwartz | |
| 6,591,241 B1 | 7/2003 | Absar et al. | |
| 6,615,169 B1 | 9/2003 | Ojala | |
| 6,751,477 B1 | 6/2004 | Alperovich | |
| 6,802,035 B2 | 10/2004 | Catreux | |
| 7,245,710 B1* | 7/2007 | Hughes | H04M 3/002 |
| | | | 379/202.01 |
| 7,283,957 B2 | 10/2007 | Minde | |
| 7,420,935 B2 | 9/2008 | Virolainen | |
| 7,432,950 B2 | 10/2008 | Deleam | |
| 7,590,181 B2 | 9/2009 | Awad | |
| 7,593,032 B2 | 9/2009 | Civanlar | |
| 7,656,948 B2 | 2/2010 | Seong | |
| 7,991,238 B2 | 8/2011 | Malvar | |
| 8,036,904 B2 | 10/2011 | Myburg | |
| 8,050,914 B2 | 11/2011 | Schmidt | |
| 8,103,006 B2 | 1/2012 | Mcgrath | |
| 8,271,276 B1 | 9/2012 | Muesch | |
| 8,626,503 B2 | 1/2014 | Schuijers | |
| 2002/0128826 A1 | 9/2002 | Kosaka | |
| 2003/0035553 A1* | 2/2003 | Baumgarte | H04S 3/00 |
| | | | 381/94.2 |
| 2003/0215013 A1 | 11/2003 | Budnikov | |
| 2005/0013309 A1 | 1/2005 | Ravishankar | |
| 2005/0249277 A1 | 11/2005 | Ratakonda | |
| 2006/0007914 A1 | 1/2006 | Chandra | |
| 2006/0013416 A1 | 1/2006 | Truong | |
| 2006/0018378 A1 | 1/2006 | Piccinelli | |
| 2006/0085200 A1 | 4/2006 | Allamanche | |
| 2007/0291951 A1 | 12/2007 | Faller | |
| 2008/0004883 A1* | 1/2008 | Vilermo | G10L 19/24 |
| | | | 704/500 |
| 2008/0008323 A1 | 1/2008 | Hilpert | |
| 2008/0068446 A1 | 3/2008 | Barkley | |
| 2008/0097764 A1* | 4/2008 | Grill | G10L 19/0212 |
| | | | 704/500 |
| 2008/0101466 A1 | 5/2008 | Swenson | |
| 2008/0140396 A1 | 6/2008 | Grosse-Schulte | |
| 2008/0158339 A1 | 7/2008 | Civanlar | |
| 2008/0255832 A1 | 10/2008 | Goto | |
| 2008/0262850 A1* | 10/2008 | Taleb | G10L 19/008 |
| | | | 704/500 |
| 2009/0010440 A1* | 1/2009 | Jung | G10L 19/008 |
| | | | 381/1 |
| 2009/0083044 A1 | 3/2009 | Briand | |
| 2009/0083045 A1 | 3/2009 | Briand | |
| 2009/0210238 A1* | 8/2009 | Kim | G10L 19/008 |
| | | | 704/500 |
| 2009/0295905 A1 | 12/2009 | Civanlar | |
| 2009/0296958 A1 | 12/2009 | Sugiyama | |
| 2010/0042747 A1 | 2/2010 | Hascalovici | |
| 2010/0063828 A1 | 3/2010 | Ishikawa | |
| 2010/0169080 A1 | 7/2010 | Tsuchinaga | |
| 2010/0191536 A1 | 7/2010 | Sampat | |
| 2010/0198589 A1 | 8/2010 | Ishikawa | |
| 2010/0229210 A1 | 9/2010 | Sharp | |
| 2010/0293584 A1 | 11/2010 | Civanlar | |
| 2010/0322429 A1* | 12/2010 | Norvell | G10L 19/24 |
| | | | 381/22 |
| 2010/0324915 A1* | 12/2010 | Seo | G10L 19/008 |
| | | | 704/500 |
| 2011/0035212 A1 | 2/2011 | Briand | |
| 2011/0039506 A1 | 2/2011 | Lindahl | |
| 2011/0040395 A1* | 2/2011 | Kraemer | G10L 19/00 |
| | | | 700/94 |
| 2011/0063407 A1 | 3/2011 | Wang | |
| 2011/0093276 A1 | 4/2011 | Raemoe | |
| 2011/0153816 A1 | 6/2011 | Lloyd | |
| 2011/0154417 A1 | 6/2011 | Civanlar | |
| 2011/0224994 A1* | 9/2011 | Norvell | G10L 19/008 |
| | | | 704/500 |
| 2011/0274156 A1 | 11/2011 | Mighani | |
| 2011/0295598 A1 | 12/2011 | Yang | |
| 2012/0035918 A1* | 2/2012 | Frankkila | G10L 19/167 |
| | | | 704/201 |
| 2012/0057715 A1* | 3/2012 | Johnston | G10L 19/008 |
| | | | 381/63 |
| 2012/0082319 A1 | 4/2012 | Jot | |
| 2012/0101826 A1 | 4/2012 | Visser | |
| 2013/0094653 A1* | 4/2013 | Bathurst | H04L 29/06 |
| | | | 381/17 |
| 2013/0216070 A1* | 8/2013 | Keiler | G10L 19/008 |
| | | | 381/300 |
| 2014/0023196 A1* | 1/2014 | Xiang | H04S 1/007 |
| | | | 381/17 |
| 2014/0025386 A1* | 1/2014 | Xiang | G10L 19/008 |
| | | | 704/500 |

FOREIGN PATENT DOCUMENTS

| | | |
|---|---|---|
| WO | 2006/107833 | 10/2006 |
| WO | 2007/035147 | 3/2007 |
| WO | 2009/068083 | 6/2009 |
| WO | 2011/071610 | 6/2011 |
| WO | 2012/058229 | 5/2012 |

OTHER PUBLICATIONS

Yang, D et al "High-Fidelity Multichannel Audio Coding with Karhunen-Loeve Transform", IEEE Transactions on Speech and Audio Processing, New York, USA, vol. 11, No. 4, Jul. 1, 2003, pp. 365-380.

Briand, Manuel "Etudes D'Algorithmes D'Extraction des Informations de Spatialisation Sonore: Application Aux Formats Multicanaux" Mar. 20, 2007, pp. 1-240.

(56) References Cited

OTHER PUBLICATIONS

Faller, C. et al. "Directional Audio Coding: Filterbank and STFT-Based Design", AES Convention May 20, 2006, New York, USA.
Duval, Benjamin "Etudes de Techniques d'Extraction de l'information spatiale dans une scene sonore multicanal" Sep. 30, 2006, pp. 1-72.
Elfitri, I. et al. "Multichannel Audio Coding Based on Analysis by Synthesis" Proceedings of the IEEE, Apr. 2011, vol. 9, Issue 4.
Beack, S. et al "Spatial Cue Based Sound Scene Control for MPEG Surround", Aug. 8, 2007, IEEE Multimedia and Expo. pp. 1886.
Boakye, Kofi Agyeman "Audio Segmentation for Meetings Speech Processing" May 2009, EECS Department of University of California.
Seefeldt, Alan "Loudness Domain Signal Processing" AES presented at the 123rd Convention, Oct. 5-8, 2007, New York, USA.
Robinson, C.Q. et al. "Dynamic Range Control Via Metadata" AES presented at the 107th Convention, New York, USA Sep. 24-27, 1999.
Herre, J. et al "Interactive Teleconferencing Combining Spatial Audio Object Coding and DirAC Technology", AES Convention, May 2010.
DVB Organization: "CM-AVC006 Summary of Enhanced AC-3" Digital Video Broadcasting, May 27, 2004, p. 4.
Chandra, S. P et al "Audio Mixer for Multi-Party Conferencing in VoIP" IEEE International Conference on Internet Multimedia Services Architecture and Applications, Dec. 9, 2009, pp. 1-6.
Pulkki, V. et al "Directional Audio Coding Perception-based Reproduction of Spatial Sound" International Workshop on the Principles and Applications of Spatial Hearing, Nov. 11-13, 2009, Zao, Miyagi, Japan.
Samanta, V. et al "Impact of Video Encoding Parameters on Dynamic Video Transcoding" First International Conference on Communication System Software and Middleware, Jan. 8-12, 2006, New Delhi, India, pp. 1-9.
Jammeh, E. et al "Smoothing Transcoded MPEG-1 Video Streams for Internet Transmission" IEEE Proceedings on Vision, Image and Signal Processing, vol. 151, Issue 4, published on Aug. 30, 2004, pp. 298-305.
Del Galdo, G. et al "Efficient Methods for High Quality Merging of Spatial Audio Streams in Directional Audio Coding" AES Convention, May 2009.

* cited by examiner

METHODS AND SYSTEMS FOR SELECTING LAYERS OF ENCODED AUDIO SIGNALS FOR TELECONFERENCING

CROSS-REFERENCE TO RELATED APPLICATIONS

This application claims priority to U.S. Provisional Patent Application No. 61/703,857 filed 21 Sep. 2012, U.S. Provisional Patent Application No. 61/703,861 filed 21 Sep. 2012 and U.S. Provisional Patent Application No. 61/703,855 filed 21 Sep. 2012, each of which is hereby incorporated by reference in its entirety.

TECHNICAL FIELD

The invention pertains to systems and methods for selecting layer(s) of a spatially layered, encoded audio signal to be transmitted to, or rendered by, at least one endpoint of a teleconferencing system.

BACKGROUND

It has been proposed to employ layered coding of audio and video transmitted in video conferencing and telephone conferencing systems. For example, U.S. Pat. No. 7,593,032, issued Sep. 22, 2009 to Civanlar, et al., discloses a video conferencing system in which transmitted audio and video are encoded using a layered coding scheme, and in which all or some of the layers of a full set of layers of the encoded video or audio may be transmitted.

It has also been proposed to encode audio data so that the encoded audio includes a monophonic layer and directional metadata which can be used (e.g., in a teleconferencing system) to render the monophonic audio content as an output soundfield (e.g., for playback on multiple loudspeakers). See, for example, V. Pulkki, et al., "Directional Audio Coding-Perception-based Reproduction of Spatial Sound," in International Workshop on the Principles and Applications of Spatial Hearing, Nov. 11-13, 2009, Zao, Miyagi, Japan.

However, until the present invention, it had not been known how to select layers (e.g., a subset of a full set of layers) of a spatially layered, encoded audio signal, in a manner providing any of a variety of benefits (described hereinbelow), including provision of a perceptually continuous teleconferencing listening experience at endpoints of a teleconferencing system, or to select layers of a spatially layered, encoded audio signal so as to provide a mix of soundfield and monophonic layers which varies over time (e.g., in a continuous manner) to endpoints of a conferencing system during a teleconference. Nor had it been known to select layers of a spatially layered, encoded audio signal to provide a selection of layers which varies over time (e.g., in a continuous manner) during a teleconference in a manner determined by application of a predetermined set of rules, where the rules relate selected subsets of layers to analyzed characteristics of at least one endpoint of a conferencing system or of audio content captured or transmitted by at least one endpoint of a conferencing system.

BRIEF DESCRIPTION OF THE INVENTION

In a first class of embodiments, the invention is a method for selecting at least one layer (e.g., a subset of a full set of layers) of a spatially layered, encoded audio signal. Typically, the method also includes a step of generating a spatially layered encoded audio signal, including each selected layer, in response to soundfield audio data, or using (e.g., forwarding or otherwise transmitting, mixing, or rendering) each selected layer of a previously encoded, spatially layered encoded audio signal. In typical embodiments, the inventive method is a teleconferencing method in which at least one node of a set of nodes (e.g., endpoints, each of which is a telephone system, and optionally also at least one server) is configured (e.g., each of the endpoints, and optionally also a server, is configured) to perform audio coding to generate spatially layered encoded audio in response to soundfield audio data, wherein the encoded audio includes any of a number of different subsets of a set of layers (e.g., all or some of the layers in the set), and the set of layers includes at least one monophonic layer and at least one soundfield layer (and optionally also at least one metadata layer comprising metadata indicative of at least one processing operation to be performed on the encoded audio). In some embodiments in the first class, the method includes a step of:

(a) in at least one of the nodes which is configured to generate spatially layered encoded audio in response to soundfield audio data, said encoded audio including any of a number of different subsets of a set of layers, said set of layers including at least one monophonic layer and at least one soundfield layer, determining a first subset of the set of layers by performing at least one of downstream capability-driven layer selection, perceptually-driven layer selection, and endpoint-driven layer selection, said first subset including at least one of said monophonic layer or said soundfield layer.

In some such embodiments, the method also includes a step of:

(b) in said at least one of the nodes, generating first spatially layered encoded audio in response to soundfield audio data, wherein the first spatially layered encoded audio includes the first subset of the set of layers but does not include any layer of said set of layers which is not included in said first subset.

In some such embodiments, the method also includes a step of:

(b) in said at least one of the nodes, selecting said first subset of the set of layers from a spatially layered encoded audio signal, but not selecting any layer of the spatially layered encoded audio signal which is not included in said first subset.

In typical embodiments of the inventive method, each of upstream audio (audio sent upstream from an endpoint to a teleconferencing server) and downstream audio (audio sent downstream from a teleconferencing server to an endpoint) is encoded in accordance with a spatially layered encoding scheme. In these embodiments, monophonic endpoints always send audio encoded with one or more monophonic layers, and soundfield endpoints can send audio encoded with one or more monophonic and/or soundfield layers. In accordance with some embodiments of the method, at least one node (endpoint or conferencing server) of a teleconferencing system determines (e.g., each endpoint and server determines in cooperation with other nodes of the system) which of the available layers should be included in each encoded audio stream transmitted therefrom to at least one other node (endpoint or server) of the system, and how the encoded audio is processed (e.g., which subset of its layers is employed to decode the encoded audio) at the element which receives the encoded audio.

In some embodiments in the first class in which step (a) includes performance of downstream capability-driven layer selection, the method includes a step of:

transmitting, to said at least one of the nodes, at least one data value indicative of at least one capability of at least one endpoint of the system, and step (a) includes a step of determining the first subset of the set of layers in response to said at least one data value. For example, when step (a) is performed by a server which also mixes streams (which have been transmitted upstream to the server) on behalf of (i.e., for transmission to) at least one downstream endpoint, the server may select (for mixing) from each upstream transmission to be mixed, the layer (i.e., soundfield or monophonic layer) which corresponds to a maximal rendering capability of the at least one downstream endpoint. For example, when the server receives audio which has undergone spatially layered encoding in an endpoint, and has then been sent upstream to the server from the endpoint, the server requires only each layer of the encoded audio which can be used by the most capable endpoint which is to receive content determined by the audio. In some embodiments, the server does not mix streams which have been transmitted upstream to said server, but instead forwards the encoded streams (or layer(s) thereof) directly to downstream endpoints (e.g., for mixing). When forwarding encoded audio streams, the server selects from each upstream transmission a subset of the layers (of the streams) which corresponds to the capabilities of each downstream node (endpoint) to receive content from each upstream transmission, and forwards only the selected subset of layers to each relevant endpoint.

In some embodiments in the first class in which step (a) includes performance of perceptually-driven layer selection, the method includes a step of:

implementing, in said at least one of the nodes, at least one of mixing and forwarding, said at least one of mixing and forwarding being implemented in a manner having a goal of producing a perceptually continuous teleconferencing listening experience at at least one endpoint (e.g., at each endpoint), and optionally also a goal of minimizing bandwidth (upstream and/or downstream bandwidth). For example, a server may implement a mixing strategy having a goal of producing a perceptually continuous teleconferencing listening experience at each endpoint while minimizing upstream and downstream bandwidth.

When considering how to mix or forward a soundfield (which has been sent upstream from a first endpoint to a server) using perceptually driven layer selection, for listening by an endpoint, a server may implement at least one mixing (or forwarding) decision based on heuristics of the first endpoint (where "heuristics" of the first endpoint denotes in this context at least one analyzed characteristic of the first endpoint or of audio content captured or transmitted by the first endpoint). Perceptually driven layer selection may be implemented at a server by deciding which layers the server should decode, mix and re-encode. Alternatively, it may be implemented at an endpoint (a client) by arranging for the server to selectively forward appropriate layer(s) downstream with metadata instructing the downstream endpoints on how to mix the forwarded streams.

Perceptually driven selection of layers in encoded audio to be forwarded (or transmitted upstream or downstream) may not be based on downstream capability (e.g., the capability of each endpoint to utilize layers of forwarded audio) or bandwidth considerations, but instead on a requirement of perceptual presence of audio content (e.g., audio uttered by a specific source, or another specific type of audio, captured by a client) in a designed mix for a particular endpoint. A server may implement at least one of mixing and forwarding of spatially layered encoded audio (in performance of a method implementing perceptually driven layer selection), such that the mixing and/or forwarding implements at least one decision based on a requirement of perceptual presence of audio content at at least one endpoint.

In some embodiments in the first class in which step (a) includes performance of endpoint-driven layer selection, at least one endpoint makes independent decisions as to which layer(s) of information (monophonic, soundfield, or metadata layers) to include in an encoded audio signal to be sent upstream, based on heuristics local to the endpoint (where "heuristics" local to the endpoint denotes in this context at least one analyzed characteristic of the endpoint or of audio content captured by the endpoint). For example, the heuristics may be indicative of whether the stream to be encoded currently contains speech, or may be indicative of the talk rate of the endpoint.

In some embodiments, a monophonic layer (of a spatially layered encoded audio signal that is generated and/or transmitted or otherwise used) is a signal component which has been adaptively extracted from a multichannel captured audio signal. Preferably, such monophonic layer is both suited to mono use and constrained in 'steering' to be perceptually plausible. The monophonic layer is typically extracted from the spatially layered encoded signal in such a way as to allow pre-processing (e.g., noise suppression) to be applied efficiently thereto to make it more suitable for use in monaural presentation (e.g., audio data indicative of the monophonic layer's content is extracted with metadata indicative of pre-processing to be performed on the audio data). The pre-processing application is typically not simply a change in signal-to-noise ratio, but rather is a perceptually guided continuous time/frequency masking (i.e., perceptually guided masking that operates jointly over time and frequency) to highlight a voice of interest, achieving leveling, noise removal and reverb reduction collectively or in any combination.

In some embodiments, different layers (e.g., different monophonic layers, or different soundfield layers, or at least one monophonic layer and at least one soundfield layer) are included in or extracted from a spatially layered encoded signal (e.g., by a processor in an endpoint to which the encoded signal has been transmitted), and different ones of the layers have different functional properties (e.g., different levels of noise suppression, leveling, dereverbation, and/or gating have been applied thereto, or are to be applied thereto as indicated by metadata associated with each layer).

Aspects of the invention include a system configured (e.g., programmed) to perform any embodiment of the inventive method, and a computer readable medium (e.g., a disc) which stores code (in tangible form) for implementing any embodiment of the inventive method or steps thereof. For example, the inventive system can be or include a programmable general purpose processor, digital signal processor, or microprocessor (e.g., included in, or comprising, a teleconferencing system endpoint or server), programmed with software or firmware and/or otherwise configured to perform any of a variety of operations on data, including an embodiment of the inventive method or steps thereof. Such a general purpose processor may be or include a computer system including an input device, a memory, and a processing subsystem that is programmed (and/or otherwise configured) to perform an embodiment of the inventive method (or steps thereof) in response to data asserted thereto.

NOTATION AND NOMENCLATURE

Throughout this disclosure, including in the claims, the terms "speech" and "voice" are used interchangeably, in a broad sense to denote audio content perceived as a form of communication by a human being. Thus, "speech" determined or indicated by an audio signal may be audio content of the signal which is perceived as a human utterance upon reproduction of the signal by a loudspeaker (or other sound-emitting transducer).

Throughout this disclosure, including in the claims, "speaker" and "loudspeaker" are used synonymously to denote any sound-emitting transducer (or set of transducers) driven by a single speaker feed. A typical set of headphones includes two speakers. A speaker may be implemented to include multiple transducers (e.g., a woofer and a tweeter), all driven by a single, common speaker feed (the speaker feed may undergo different processing in different circuitry branches coupled to the different transducers).

Throughout this disclosure, including in the claims, each of the expressions "monophonic" audio, "monophonic" audio signal, "mono" audio, and "mono" audio signal, denotes an audio signal capable of being rendered to generate a single speaker feed for driving a single loudspeaker to emit sound perceivable by a listener as emanating from one or more sources, but not to emit sound perceivable by a listener as originating at an apparent source location (or two or more apparent source locations) distinct from the loudspeaker's actual location.

Throughout this disclosure, including in the claims, the expression "soundfield" audio (or "soundfield" audio signal) denotes an audio signal (typically, but not necessarily, a multichannel audio signal) capable of being rendered to generate speaker feeds for driving at least two loudspeakers (e.g., a pair of headphones) to emit sound perceivable by a listener as emanating from one or more sources, including at least one source at an apparent source location distinct from the actual location of any of the loudspeakers. An example of soundfield audio is stereo audio, which is capable of being rendered to generate a Left speaker feed for driving a Left speaker and a Right speaker feed for driving a Right speaker.

Throughout this disclosure, including in the claims, the expression "monophonic layer" (or "mono layer") of an encoded audio signal denotes content of the encoded audio signal (e.g., a sequence of data values indicated by the encoded audio signal) that is indicative (when decoded) of a monophonic audio signal.

Throughout this disclosure, including in the claims, the expression "soundfield layer" of an encoded audio signal denotes: content of the encoded audio signal (e.g., a sequence of data values indicated by the encoded audio signal) that is indicative, when decoded, of a soundfield audio signal; or, in the case that the encoded audio signal also includes a monophonic layer, content of the encoded audio signal (e.g., a sequence of data values indicated by the encoded audio signal) that is indicative (together with the monophonic layer), when decoded, of a soundfield audio signal. For example, an encoded audio signal may include a soundfield layer and a monophonic layer, which together (when decoded) are indicative of a soundfield audio signal. When the soundfield layer is omitted from this exemplary encoded audio signal, the remaining monophonic layer is (when decoded) indicative of a monophonic audio signal but is not indicative of the soundfield audio signal.

Throughout this disclosure, including in the claims, the expression "spatially layered" encoded audio (or "spatially layered" encoded audio signal) denotes an encoded audio signal including at least one monophonic layer and at least one soundfield layer. When decoded, at least one said soundfield layer, together with at least one said monophonic layer, is indicative of a soundfield audio signal. When each said soundfield layer is omitted from the spatially layered encoded audio signal, at least one remaining monophonic layer is (when decoded) indicative of a monophonic audio signal, but no remaining monophonic layer is (when decoded) indicative of the soundfield audio signal (and when at least two monophonic layers remain, all remaining monophonic layers considered together fail (when decoded) to be indicative of the soundfield audio signal).

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X–M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

DETAILED DESCRIPTION OF THE PREFERRED EMBODIMENTS

Many embodiments of the present invention are technologically possible. It will be apparent to those of ordinary skill in the art from the present disclosure how to implement them. Embodiments of the inventive system and method will be described with reference to FIGS. 1 and 2.

Figure 1:
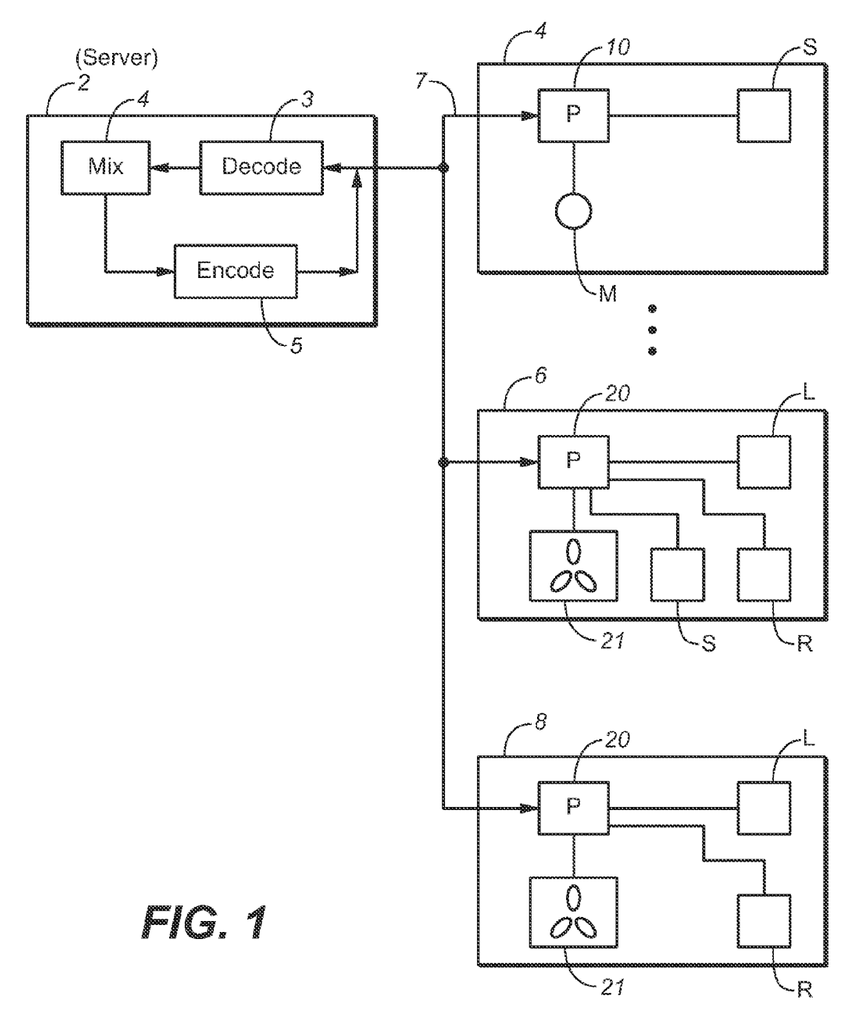
FIG. 1 is a block diagram of an embodiment of the inventive teleconferencing system.

FIG. 1 is an embodiment of the inventive teleconferencing system, which comprises nodes (endpoints 4, 6, and 8, and optionally other endpoints, and teleconferencing server 2) coupled to each other by a link 7. Each of the endpoints is a telephone system (e.g., a telephone). Link 7 can be the link employed by any VOIP system, data network, or telephone network (e.g., any conventional telephone network) to implement data transfer between telephone systems. In typical use of the system, at least two of the endpoints are involved in a conference telephone call. Each endpoint is either a soundfield endpoint or a monophonic endpoint.

The expression "soundfield endpoint" is used herein to denote an element of a teleconference system which is configured to capture a multichannel representation of a soundfield incident at a microphone array. An example of a soundfield endpoint is a conferencing telephone equipped with a soundfield microphone array and multiple speakers.

The expression "monophonic endpoint" is used herein to denote an element of a teleconference system which is not a soundfield endpoint, and is configured to capture a single audio stream. Examples of monophonic endpoints include a traditional telephone with a single microphone, a device with a headset including a boom microphone, and a laptop computer with an inbuilt microphone.

Telephone system 4 (comprising microphone M, loudspeaker S, and audio processor 10, connected as shown) is a monophonic endpoint. Each of systems 6 and 8 is a soundfield endpoint.

Telephone system 6 comprises microphone array 21 (including three microphones), left channel loudspeaker L, right channel loudspeaker R, surround channel loudspeaker S, and audio processor 20, connected as shown. Telephone system 8 comprises microphone array 21 (identical to array 21 of system 6), left and right channel loudspeakers L and R, and audio processor 20 (identical to processor 20 of system 6), connected as shown. Processor 10 is configured to assert to link 7 an encoded audio signal (indicative of sound captured by microphone M) for transmission over link 7 to server 2 and endpoints 6 and 8, including by performing necessary pre-processing and encoding. Processor 10 is also configured to receive (and decode) encoded audio signals transmitted over link 7 from server 2 and/or endpoint 6 and/or endpoint 8, and to render the decoded audio for playback on speaker S, including by performing necessary pre-processing on the received audio signal(s).

Processor 20 is configured to assert to link 7 an encoded audio signal (indicative of sound captured by microphone array 21) for transmission over link 7 to server 2 and the other endpoints of the system, including by performing necessary pre-processing and encoding. Processor 20 is also configured to receive (and decode) encoded audio signals transmitted over link 7 from server 2 and/or other endpoints of the system, and to render the decoded audio for playback on a set of loudspeakers (e.g., speakers L and R of endpoint 8 or speakers L, R, and S of endpoint 6), including by generating speaker feeds for the speakers and performing necessary pre-processing on the received audio signal(s).

In variations on the FIG. 1 system, at least one soundfield endpoint (e.g., a variation on endpoint 6 or 8) includes a microphone array different than that of endpoint 6 or 8 of FIG. 1 (e.g., an array comprising more than or less than three microphones), and/or it lacks a set of loudspeakers or it includes a set of loudspeakers (e.g., headphones) different than that of endpoint 6 or 8 of FIG. 1 (e.g., a set comprising more than three loudspeakers).

Teleconferencing server 2 of the FIG. 1 system includes decoding stage 3 (coupled and configured to receive and decode encoded audio signals transmitted over link 7 from endpoints of the system), mixing stage 4 (coupled and configured to perform optional mixing of decoded audio signals from endpoints of the system), and encoding stage 5 (coupled and configured to encode mixed audio from stage 4 for transmission over link 7 to some or all endpoints of the system), coupled as shown. Server 2 is operable in a mode in which it simply forwards (without decoding or encoding) encoded audio received over link 7 from any endpoint of the system to some or all of the endpoints of the system.

Decoding by an element of the inventive system (e.g., element 3, 10, or 20 of the FIG. 1 system) may include transforming encoded frequency-domain data into time-domain data.

The endpoints of the FIG. 1 system are connected to each other in a peer-to-peer fashion, and in some implementations, may operate in a peer-to-peer mode in which encoded audio streams are sent from each endpoint directly to the other endpoints. In such implementations, server 2 may be omitted. The endpoints of the FIG. 1 system are also connected to each other in a client-server fashion, and may operate in a client-server mode in which each endpoint sends audio upstream to teleconferencing server 2, and receives audio which has been sent downstream from server 2. In some cases, server 2 may function in the client-server mode as a mixer or bridge which decodes the audio which has been sent upstream (to the server) from each endpoint, mixes together audio from multiple endpoints, and re-encodes the decoded and/or mixed audio and sends it downstream to an endpoint (or to all or some of the endpoints). In some cases, server 2 may function in the client-server mode by forwarding encoded streams directly from one endpoint to another. In order to offload computational load to the endpoints, server 2 may be operable to forward multiple streams to an endpoint accompanied by instructions on how the endpoint should mix them together before rendering.

Each of processors 10 and 20 of the FIG. 1 system is configured to implement a spatially layered audio coding scheme for soundfield representation. Thus, each processor is configured to encode input audio as a spatially layered, encoded audio signal, including at least one monophonic layer and at least one soundfield layer. When decoded, at least one said soundfield layer, together with at least one said monophonic layer, is indicative of a soundfield audio signal. When each soundfield layer is omitted from the spatially layered encoded audio signal, at least one remaining monophonic layer is (when decoded) indicative of a monophonic audio signal, but no remaining monophonic layer is (when decoded) indicative of the soundfield audio signal.

The spatially layered audio coding scheme has multiple layers which, when combined, provide generally increasing levels of soundfield fidelity. In typical implementations the coding scheme includes two or more of the following layers:

M—A single channel (monophonic) audio stream (e.g., coded with a flexible sample rate representation). M typically has been cleaned (e.g., by application of noise suppression and/or leveling) and is typically suitable for discontinuous (e.g., DTX) transmission. In some embodiments, a monophonic audio layer M (of spatially layered, encoded audio) is indicative of audio captured by a microphone; in other embodiments it is otherwise generated. It should be appreciated that in some embodiments of the invention, spatially layered, encoded audio includes a layer indicative of a first monophonic audio signal E1 (of the type described below) and also includes metadata ("g"). In some such embodiments, the first monophonic signal E1 together with the metadata "g" are sufficient to determine a second monophonic audio signal (which can be referred to as "M"), but the second monophonic audio signal is not included as a specific layer of the spatially layered, encoded audio;

M Th—an additional metadata layer ("Th") which, with the layer "M," facilitates upmixing for rendering of the sound (indicated by layer M) as an output soundfield (for playback on multiple loudspeakers) indicative of the content (e.g., conference participant utterances) of layer M. For example, the upmixed audio may be rendered such that the sound uttered by a conference participant (indicated by layer M) is perceived as originating from a source position (e.g., which does not coincide with the actual location of any of the loudspeakers), and the metadata "Th" may be indicative of the source position. The metadata "Th" may be relevant to an upstream device (e.g., server 2), for example, by indicating properties of the signal M obtained from a client. The metadata "Th" may be relevant to a downstream device (e.g., endpoint 6 or 8) by indicating properties for rendering the soundfield indicative of signal M (e.g., with a desired scene layout, effect, transitions, and consistency);

M g—The above signal M with additional metadata ("g") which facilitate creation of a dynamically processed (e.g., having undergone dynamic range compression) and/or spectrally processed (e.g., noise suppressed, equalized) version of the M signal suitable for playback on a monophonic device (e.g., a traditional telephone). The metadata "g" are typically indicative of a frequency-banded gain profile. For example, "g" may be indicative of a banded gain profile determining a fully cleaned (or an approximation to a fully cleaned) version of the M signal. The metadata "g" may be indicative of a gain profile which determines time and frequency varying filtering, which in turn can achieve a functional outcome (e.g., an approximation of originally captured speech content without the corruption of noise, reverb, microphone limitations (sibilance) and distance or medium induced level variations;

E1—A monophonic signal representing utterances of a conference participant who is a dominant talker (i.e., a monophonic signal indicative of sound uttered by a dominant conference participant), extracted from an originally captured soundfield (typically with no dynamics/spectral processing applied thereto). Signal E1 may be generated (in a manner to be described below) from a horizontal B-format signal captured by microphone array 21;

E1 g—The above signal E1 with additional metadata ("g") which facilitate creation of a dynamically processed (e.g., having undergone dynamic range compression) and/or spectrally processed (e.g., noise suppressed, equalized) version of the E1 signal suitable for playback on a monophonic device (e.g., a traditional telephone). The metadata "g" are typically indicative of a frequency-banded gain profile. For example, "g" may be indicative of a banded gain profile determining a fully cleaned (or an approximation to a fully cleaned) version of the E1 signal. The metadata "g" may be indicative of a gain profile which determines time and frequency varying filtering, which in turn can achieve a functional outcome (e.g., an approximation of originally captured speech content without the corruption of noise, reverb, microphone limitations (sibilance) and distance or medium induced level variations. Such a gain profile may comprise a constructive instruction for obtaining a monophonic audio signal representation on the basis of the signal E1. The constructive instruction may for instance comprise a gain to be applied to each of different frequency bands of the monophonic signal E1 to generate another monophonic signal M. Alternatively, the metadata "g" may determine a broadband gain (which may implement aspects of dynamic range control or phrasing in accordance with utterances), or a frequency-variable gain profile (which may clean frequency components that are expected to convey sound other than speech or apply some frequency and time varying filter that may have otherwise been applied at the time of the input audio processing to arrive at a desired mono output for a particular purpose);

E1 g Th—The above-described "E1 g" layer plus an additional metadata layer ("Th") which facilitates spatial synthesis of an output soundfield (for playback on multiple loudspeakers) indicative of the content (e.g., conference participant utterances) of layer E1 g (or E1). For example, the metadata "Th" may facilitate upmixing for rendering of the sound (indicated by layer E1 g) as an output soundfield (for playback on multiple loudspeakers) indicative of the content of layer E1 g (i.e., an output soundfield containing only utterances of a dominant conference participant), which will be perceived as being emitted from some source position relative to the listener. The source position does not necessarily, and does typically not, coincide with the position of a loudspeaker of the loudspeaker array employed to render the soundfield. For example, the upmixed audio (generated in response to the E1 g Th data) may be rendered such that the sound uttered by the dominant talker is perceived as originating from a source position, and the metadata "Th" may be indicative of the source position. The metadata "Th" may be spatial parameters which facilitate upmixing for rendering of the sound (indicated by layer E1 g or E1) as an output soundfield, where the upmix operation may include filtering and mixing operations including, for example, panning, reverberation and decorrelation of the sound (indicated by layer E1 g or E1) based on the spatial parameters. The generated soundfield representation may (but need not) be a lower cost/bandwidth alternative to an originally captured soundfield or the soundfield determined by layers E1, E2, and E3 (obtained from an originally captured soundfield). For example, the metadata "Th" may only cause angles (from which rendered audio is perceived to emanate) to change at times at which a known audio object (e.g., a person) is definitely active (e.g., it may implement hysteresis). In some cases, metadata "Th" may represent a functional representation of the audio activity, for example effecting the position of the output rendered audio such that certain participants and audio from different endpoint locations are heard from desired directions which may be other than those originally observed at the capturing microphones. The metadata "Th" may be spatial parameters adapted for use in spatial synthesis of a first rotated audio signal (e.g., signal E1), or a signal derived therefrom, into a soundfield representation (e.g., of the sound captured by a microphone array). For example, a multi-channel signal representation may be obtainable from the first rotated audio signal by performing an upmix operation (e.g. involving decorrelation and/or filtering and mixing operations comprising, for example, panning and/or reverberation), based on the spatial parameters. The soundfield representation may (but need not) be a second soundfield representation which is a lower cost/bandwidth alternative to a first soundfield representation (e.g., one determined by E1, E2, and E3, or by E1, E2, E3, and K). The second soundfield representation may be a more functional representation of audio activity than is the first soundfield representation, for example effecting the position of the output rendered audio such that certain participants and audio from different endpoint locations are heard from desired directions which may be different than the directions originally observed at capturing microphones;

E1 g Th E2 E3 K—The "E1 g Th" layers plus residual signals E2, E3 and metadata "K" which allow full reconstruction of an original spatial acoustic soundfield (minus any coding loss) suitable for rendering over headphones using binaural virtualization techniques or for rendering over a loudspeaker array using soundfield decoding techniques. The original soundfield is assumed to have a multichannel representation (WXY), indicative of sound captured by a microphone array (to which some light processing may have been applied). Typically, a transmission indicative of such a WXY representation is a continuous (e.g., CTX) transmission (in which frames of data are continuously transmitted, even during periods of speech inactivity). The originally captured soundfield (WXY) is also assumed to have a rotated or mixed representation (E1 E2 E3) which is an instantaneously rotated or mixed version of WXY, where E1 is the above-mentioned monophonic signal representing a dominant talker. The metadata "K" are indicative of rotation parameters used in the mapping of WXY to E1 E2 E3 (or E1 E2 E3 to WXY), and can be used for full reconstruction of WXY from E1 E2 E3 K. Typically, the metadata "K" indicate a specification of the rotation, and if utilized, parametric encoding or waveform resynthesis information; and WXY—a multichannel audio signal indicative of a soundfield captured by a microphone array. Typically, the WXY signal is indicative of horizontal B-format multichannel audio data, said data have a frequency domain representation in which for each frequency, the data are indicative of a time-dependent amplitude (W) of a source, at an azimuth angle $\theta$ with respect to the capturing microphone array, the component "W" is an omnidirectional, time-dependent amplitude, and the components "X" and "Y" are $X=(\cos\theta)\times W$, and $Y=(\sin\theta)\times W$. Optionally, to generate the WXY audio, light processing (e.g., cleaning, rendering, mixing, and/or other manipulation) is applied to audio (e.g., horizontal B-format audio) captured by a microphone array.

Alternatively, input signal WXY is or is replaced by another multichannel audio signal, where each channel has some consistent and fixed definition in terms of rendering and the intended signal to be delivered to the listener. For example, in some variations on the FIG. 2 system, the multichannel audio signal input to the system may comprise two audio channels, or more than three audio channels (similarly, the multichannel output of transform stage 38, or a variation on stage 38, may comprise two channels, or more than three audio channels). Since almost any audio content can be decoded to a set of fixed speaker feeds suitable for playback (with appropriate conversion or rendering), signal WXY (or another audio signal input to an embodiment of the inventive encoder) could have any of a wide variety of formats (e.g., the Dolby Atmos™ format, provided it is reduced to a single intended soundfield prior to encoding. An example of this may be the equivalent soundfield or associated speaker fields for a single listener at the sweet spot) and could be indicative of any of a wide variety of input sources, including the outputs of multiple microphones (spot microphones).

The rotated soundfield representation (E1 E2 E3 K, as mentioned above) of a horizontal B-format signal WXY may be an instantaneously rotated or mixed version of WXY, where component E1 is a monophonic signal indicative of (or is related closely to) sound uttered by a dominant participant (talker) in a conference. Typically, E1 is derived from WXY, and E2 and E3 (also derived from WXY) are audio signal components (e.g., in orthogonal directions with respect to a capturing microphone array) that are sufficient, with component E1 (or with E1 and metadata K), to reconstruct the originally captured WXY soundfield audio. The metadata K may be indicative of the rotation (i.e., the angle(s) of rotation) performed to generate rotated audio data E1, E2, and E3 in response to the input WXY data.

Figure 2:
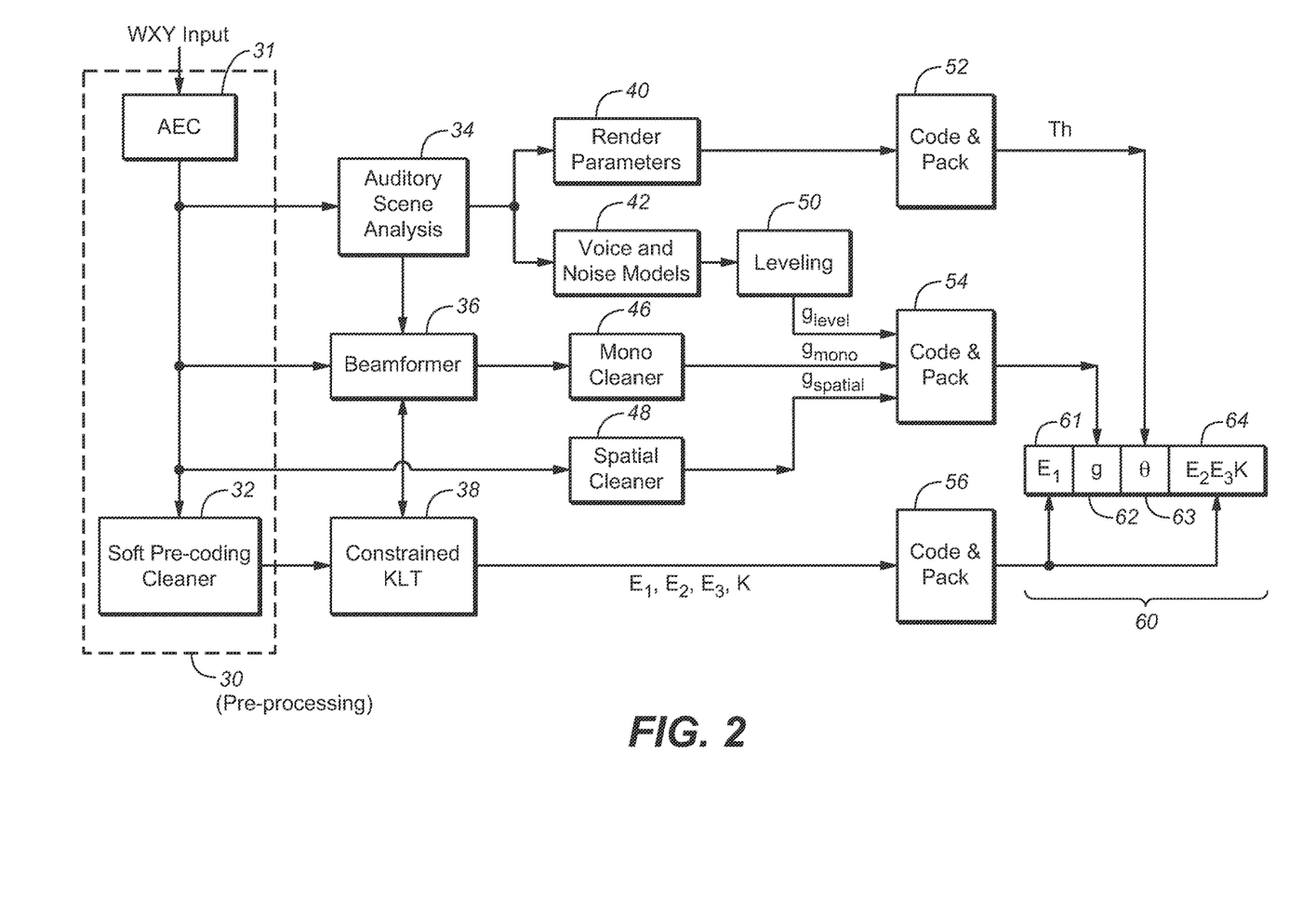
FIG. 2 is a block diagram of an embodiment of an encoding subsystem of an embodiment of the inventive system.

A rotation (or other orthogonal transformation) performed (in stage 38) to generate E1, E2, and E3 may be adaptive and based on estimated covariances of the input audio signals (e.g., W, X, and Y), on which an eigen-analysis is performed. Preferably, the eigen-analysis may be preceded by a temporal smoothing on consecutive (time-segment-wise, e.g., frame-wise) values of the estimated covariances or the input audio values. The smoothing may in turn be signal-adaptive. To achieve this, the metadata K may include a time-varying directivity-related parameter (which will sometimes be referred to below as parameter "d"), which provides a key to (e.g., determines) the suitable degree of smoothing to be applied (e.g., to each frame, or other segment, of the input data). For coding purposes (e.g., transmission or storage), coding errors are likely to arise when the input data are indicative of a highly directive soundfield (e.g., produced by a single audio source). The "highly directive" property can be indicated by a relatively high value (e.g., close to 1) of the parameter d, which in turn indicates that it is beneficial to increase the amount of smoothing applied in connection with the rotation. Conversely, low values of the parameter d (e.g., values approaching 0), which may occur when the strongest eigensignal is capturing the soundfield using an omni-directional sensitivity pattern, may indicate that the amount of smoothing (applied in connection with the rotation) can or should be decreased. At low bit rate, only a small number of quantization levels are available, and fluctuations in the coded output (e.g., in the signals E1, E2, and E3) may be noticeable. To reduce the impact of such fluctuations in some cases, a higher degree of smoothing should be applied in connection with the rotation. For soundfield analysis purposes, observables obtained by an eigen-analysis on estimated covariances (such observables include direction of arrival, directivity etc.) can in some cases be obtained more reliably, with less fluctuations, by applying temporal smoothing to the underlying covariances than by applying temporal smoothing to the observable itself.

The "E1" content typically approximates the dominant component of a captured soundfield at any instant in time, and is typically obtained by rotation of a captured soundfield signal to place the largest energy or perceptual signal entropy in a first channel (the E1 channel). This is advantageous for two reasons:

the rotation allows a dynamic allocation of bits across multiple audio channels with more being allocated for the first channel, and/or subsequent channels utilizing parametric approaches to coding; and the component allocated to the first channel (E1) is usually the desired mono signal, and typically has an amount of noise suppression related to the diversity of the capturing microphone array and/or the order of the soundfield representation.

Generally, a fast rotation provides the best coding gain by optimizing the allocation of bits to the multiple channels at each block instant. However, rapid variations in the rotation could result in the signal E1, when heard on its own, being unstable.

Above-described layers "M," "E1," and "E1 g" are monophonic layers. Above-described layers "Th," "E2 E3 K," "E1

E2 E3 K," and "WXY" are soundfield layers. Monophonic layer M (or "M g") with layer Th, when decoded, are indicative of a soundfield audio signal. Layer E1 (or "E1 g") with layer Th, when decoded, are indicative of a soundfield audio signal. Monophonic layer M (or E1 or "E1 g") with layer "E2 E3 K," when decoded, are also indicative of a soundfield audio signal.

A single, layered encoded audio signal (one encoded bitstream) can be encoded in layered fashion to include all or some of the noted layers, in the sense that the signal includes data sufficient for a decoder (configured to decode audio encoded in accordance with a first subset of the layers) to decode the first subset of the layers of the signal, and for a decoder (configured to decode audio encoded in accordance with a second subset of the layers) to decode the second subset of the layers of the signal, and so on for all subsets of the encoding layers. Thus, a decoder configured to decode audio encoded in accordance with the E1 g Th E2 E3 K scheme can decode an encoded signal (comprising data E1, g, Th, E2, E3, and K) to reconstruct the original soundfield WXY (e.g., as captured with a microphone array) or the rotated soundfield E1 E2 E3. Similarly, a decoder configured to decode audio encoded in accordance with the E1 g scheme can decode an encoded signal (comprising data E1 and g) to reconstruct the above-noted monophonic signal E1, including by using the "g" metadata to decode a dynamically (e.g., compressed) and/or spectrally processed version of the monophonic signal.

In typical embodiments of the present invention, each of upstream audio (audio sent upstream from an endpoint to a server) and downstream audio (audio sent downstream from a server to an endpoint) is encoded using a spatially layered encoding scheme. In these embodiments, monophonic endpoints always send audio encoded with one or more monophonic layers (e.g., M, E1, or E1 g layers, or one or more similar or equivalent monophonic layers), and soundfield endpoints can send audio encoded with one or more monophonic and/or soundfield layers (e.g., any of the layers described above, or one or more similar or equivalent layers). In accordance with typical embodiments of the inventive method, each endpoint and conferencing server of a teleconferencing system determine (e.g., determine cooperatively) in which of the available layers each audio stream should be coded and transmitted, and how the coded audio may be used at the server and at each endpoint.

In considering a telephony system and a spatially layered coding scheme, two important properties should be noted. First, as long as the encoding is performed in a suitable way, a server wanting to forward a packet (sent upstream to the server) to a downstream endpoint may optionally demote a stream from a higher fidelity representation to a lower fidelity representation simply by removing layers of information. For example, if a packet is received from endpoint A (e.g., endpoint 6 or 8 of FIG. 1) in format E1 g Th E2 E3 K, the server may choose to truncate the packet when forwarding, such that only layers E1 g are received at endpoint B (e.g., endpoint 4 of FIG. 1). This would have the effect that endpoint B is unable to render the full soundfield of endpoint A, but can only render a monophonic representation of the soundfield. However, endpoint A is still capable of rendering a distortion-free (disregarding perceptual coding artifacts) monophonic signal while the server has reduced the entropy transmitted on the downstream link.

Second, just as a server may discard information when forwarding a packet, an endpoint (e.g., any of endpoints 4, 6, and 8 of FIG. 1) receiving an encoded packet, from a server (in the client-server case) or directly from another endpoint (in the peer-to-peer case), may choose to freely discard layers of information and render the stream at a lower spatial fidelity. This enables an endpoint device which is incapable of rendering a soundfield to make use of a stream which is soundfield-encoded.

In both cases it is possible for a packet to be received (by a server or endpoint) which contains redundant information. Such redundant information is not harmful to the correct operation of the system except that in it causes more data to be exchanged than is strictly necessary. In such cases, we would typically prefer to decrease the number of layers in which the audio is coded to save bandwidth. In a similar way, there may be times when a server or client could make use of additional information not currently contained within incoming transmissions. In such cases, we may prefer to increase the number of layers in which the audio is coded to increase spatial fidelity. Therefore, some embodiments of the inventive method employ feedback systems, for example, as follows:

1. a server may send feedback information to a client to ask the client to increase or decrease the number of layers in subsequent upstream audio transmission, or 2. a client may send feedback information to a server to ask the server to increase or decrease the number of layers in subsequent downstream audio transmission, and/or 3. a client may send feedback information to another client to ask said other client to increase or decrease the number of layers in subsequent peer-to-peer audio transmission.

FIG. 2 is a block diagram of an embodiment of an encoding subsystem (e.g., encoder 10 or 20 of FIG. 1) included in some embodiments of the inventive system.

The encoder of FIG. 2 is coupled to receive input audio data, WXY, which are horizontal B-format multichannel audio data indicative of a soundfield captured by a microphone array. Pre-processing stage 30 of the FIG. 2 encoder includes AEC stage 31, configured to perform acoustic echo cancellation (e.g., conventional acoustic echo cancellation) on the input audio and soft pre-coding cleaning stage 32, configured to perform cleaning (e.g., noise reduction) on the input audio.

The output of stage 31 is asserted to auditory scene analysis stage 34 and to beamforming stage 36. Stage 34 may be implemented in a conventional manner to analyze (e.g., by applying statistical analysis to) the echo-cancelled input audio (which is indicative of a multiple microphone soundfield capture) to segment the audio, and to identify audio objects indicated by the signal (e.g., an audio object indicated by each segment of the signal). Each segment (a stream of audio data samples) may be identified as being indicative of sound emitted from a specific source or set of sources. Stage 34 may determine (e.g., in a conventional manner) a scene map (or "scene description" or "sound scene") comprising data describing each identified audio object (e.g., data indicating a type or source of each object, and a location or trajectory of at least one source which emits the sound comprising the object). An example of an audio object is sound emitted from a specific source (e.g., voice uttered by a specific person). Stage 34 also generates voice and noise models 42 (to be described below).

Scene analysis stage 34 typically determines an updated scene description in response to each segment of the audio signal, which typically includes a set of audio objects indicated by the signal and an associated scene state. This description is stored (e.g., in a register or set of registers) and made available to other elements of the FIG. 2 system. Examples of objects and associated parameters included in the scene description include one or more of: direction mean and variance (e.g., indicative of location of a conference participant who utters speech indicated by the audio signal); distance mean and variance (e.g., indicative of location of a conference participant who utters speech indicated by the audio signal); degree of diffusivity; likelihood or ratio of detected voice activity from an object; likelihood that (or another state variable related to determination that) an object is a nuisance rather than a non-nuisance object (e.g., where the non-nuisance object is speech uttered by a voice conference participant, the nuisance might be typing or other background noise present during the voice conference along with speech uttered by conference participants); last time active; relative participation in local scene; relative participation in a voice conference; classification as desirable or undesirable object; and estimated level of voice activity from the object.

Typically, the auditory scene analysis performed by stage 34 builds up over time a map of objects within an audio scene described by the incoming audio signals. Such analysis may have physical and perceptual elements and historical learning that extends well beyond that which would be employed to implement rotation in stage 38. For example, when multiple sources are simultaneously active, it can become difficult to resolve the unique incident directions of arrival. Given the history of audio up to that point, some implementations of the auditory scene analysis are able to handle such a situation appropriately, so that the rendering parameters 40 (generated by stage 34) are indicative of a plausible configuration and activation of objects.

Rendering parameters 40 are generated by stage 34. These parameters determine the above described "Th" metadata, and may include parameters indicative of the orientation of the current dominant talker of a conference relative to a capturing microphone array or an assumed listener position. The "Th" metadata facilitates upmixing for rendering of the sound (indicated by layer M, M g, E1, or E1 g) as an output soundfield indicative of the audio content of layer M, M g, E1, or E1 g (e.g., an output soundfield containing only utterances of a conference participant who is a dominant talker). For example, the upmixed audio (determined using the Th metadata) may be rendered such that the sound uttered by a dominant talker is perceived as originating from a specific source position, and the metadata "Th" may be indicative of the source position.

Stage 34 of the FIG. 2 encoder is typically configured to perform voice detection on the echo-cancelled input audio to identify voice segments and noise segments thereof, and for each voice segment, determines an estimated voice level for the segment. Stage 34 may also be configured to determine, for each noise segment, an estimated noise level for the segment. Stage 34 determines voice and noise models 42 which are indicative of the results of these operations. The models 42 may be indicative of at least one characteristic (e.g., level) of the noise of the echo-cancelled input audio. Leveling stage 50 is coupled and configured to determine, from models 42, gain values (metadata), $g_{level}$, which are useful for performing leveling on the echo-cancelled input audio, including by determining an updated gain for each voice segment of the audio, and an updated gain for each noise segment of the audio. Each voice (or noise) segment can be modified (e.g., at an endpoint which receives a transmitted version of the audio, or a rotated representation, E1, E2, E3, K, thereof) by applying a gain (determined by the relevant one(s) of the $g_{level}$ values) thereto such that an estimated voice (or noise) level determined for the segment is shifted to a predetermined target level.

Stage 34 may implement voice detection to detect voices in the audio input, and the voice and noise models 42 (or the gain values, $g_{level}$, determined in stage 50) may include gain values (metadata) $G_{VAD}$ which are useful for performing phrasing and fade-in and fade-out related to voice activity detection (e.g. VAD gating). The signals and information obtained in the analysis stages of pre-processing and encoding in accordance with the invention may be used together with rules, heuristics, adaptation and thresholds to achieve a measure of voice activity detection. In some embodiments, this may be achieved using derived statistical parameters from the input signals such as banded powers, distance from the noise and/or echo level and appropriate longer term means and variances of the same. Such features can be used to train an appropriate classifier using, for example, techniques known in the art such as adaptive boosting or support vector machines. In some embodiments, the voice activity analysis will provide input and also draw state information from the auditory scene analysis which may help to provide confidence, adaptation and thresholds around the classification of voice activity at any point in time.

Soundfield audio cleaning stage 48 is coupled and configured to determine cleaning (e.g., noise reduction and/or equalization) to be performed on the echo-cancelled soundfield audio output from stage 31. Typically, the cleaning is to be performed (in an endpoint) in the frequency-domain on a frequency-banded, frequency-domain representation of the data asserted to stage 48, and is (or is equivalent to) attenuation, on a frequency band-by frequency band basis, of the frequency components in each band of the data. Stage 48 generates "$g_{spatial}$" metadata indicative of the attenuation to be performed on each frequency band of the data.

Beamforming stage 36 of the FIG. 2 encoder is coupled to scene analysis stage 34 and transform stage 38, and is typically configured to determine the location (e.g., azimuth angle) of the dominant sound source indicated by the echo-cancelled input audio. When so configured, beamformer 36 may determine a time-varying sequence of angles by which transform stage 38 rotates the cleaned WXY audio to generate the above-mentioned E1, E2, E3, and K values.

Monophonic audio cleaning stage 46 is coupled and configured to determine cleaning (e.g., noise reduction and/ or equalization) to be performed on the monophonic data stream E1 determined in stage 38, e.g., cleaning sufficient to generate a second monophonic audio data stream (e.g., above-mentioned layer M) in response to monophonic data stream E1. Typically, the cleaning is to be performed (in an endpoint) in the frequency-domain on a frequency-banded, frequency-domain representation of the second monophonic audio data, and is (or is equivalent to) attenuation, on a frequency band-by frequency band basis, of the frequency components in each band of the data. Stage 46 generates "$g_{mono}$" metadata indicative of the attenuation to be performed on each frequency band of the data.

Typically, the noise reduction determined by the "$g_{mono}$" metadata and the "$g_{spatial}$" metadata (determined in stage 48) improves the ratio of the desired (voice) and background (noise) signal in the relevant content. As noted, the "$g_{mono}$" metadata may be indicative of attenuation to be performed on each frequency band of a monophonic data stream E1 generated in stage 38, to determine another monophonic audio data stream (e.g., above-mentioned audio signal M) in response to the stream E1.

More generally, one or both of beamformer 36 and stage 48 determine (or have knowledge of) the second monophonic signal (e.g., above-mentioned monophonic audio signal M) which is in turn determined by the monophonic data stream E1 and the "$g_{mono}$" metadata. Since the second monophonic signal will be derived (at an endpoint) from E1 and the "$g_{mono}$" metadata, e.g., by application of a subtractive spectral gain profile determined by $g_{mono}$, stage 46 must also have knowledge of the nature of E1. When the auditory scene analysis (performed in stage 34) constructs longer term estimate of audio object properties, beamformer 36 may additionally use instantaneous spatial analysis, and reference to the state of the transform implemented by stage 38, to determine a spatial component of suppression to be included in the $g_{mono}$ metadata. Thus, the $g_{mono}$ gain profile may not only be sufficient to correct undesirable signal components to which E1 would otherwise be subject, but may also benefit from a spatial or beamforming analysis that is specific to a functional output requirement that the second monophonic signal (e.g., signal M), to be generated by application of $g_{mono}$ to E1, is indicative of (e.g., focused on) a dominant source of interest. In forming E1, the transform (constrained KLT) implemented by stage 38 typically compacts the energy of the input signals and forms E1 such that E1 contains the signal component of largest energy or entropy. This can cause E1 to be a reasonable approximation to the desired signal component. However, given a different functional intent of any cleaned monophonic signal (e.g., signal M), the dominant spatial components desired in the cleaned monophonic signal may differ from those in E1 to achieve the highest coding efficiency. To achieve this, the scene analysis, beamforming and constrained KLT operations (implemented by stages 34, 36, and 38) may work together (including by sharing information). Longer term information regarding an audio scene (determined in stage 34) may be used to generate the above-discussed "Th" data and to assist in creating targets for spatial beamforming (to be used in connection with generation of the $g_{mono}$ metadata). Beamformer 36 may refer to these targets, and also to the instantaneous mapping of E1, in order to create an appropriate aspect of the gain profile (determined by $g_{mono}$, $g_{spatial}$, $g_{level}$) that may include spatial beamforming in the monophonic audio signal which results from application of the gain profile to E1. The transform performed by stage 38 may additionally utilize information from beamformer 36, which may be (or include) information determined by (or with the benefit of) spatial analysis performed in stage 34.

The processing in stages 50, 46, and 48 performs a stack of analysis, but does not apply it to the audio being encoded. Rather, it determines metadata "g" which in turn determines instructions for endpoints which receive the encoded audio data. The endpoints may or may not actually implement these instructions. For example, each endpoint could be implemented to be capable of choosing how aggressively to apply the processing envelope or instructions determined by the metadata "g."

Transform stage 38 of the FIG. 2 encoder is configured to transform (by rotation or another orthogonal transformation) the cleaned WXY data (asserted at the output of stage 32) into E1 E2 E3 K data of the type described above. As noted above, the WXY data typically determine a horizontal B-format multichannel representation of a captured soundfield, which assumes a time-dependent amplitude (W) of a source at azimuth angle θ with respect to a capturing microphone array. Optionally, to generate WXY, light processing (e.g., cleaning, rendering, mixing, and/or other manipulation) is applied to B-format audio originally captured by a microphone array. The component "W" is an omnidirectional, time-dependent amplitude, and the components "X" and "Y" are X=(cos θ)×W, and Y=(sin θ)×W. Of course, a frequency domain representation of WXY data has three components (W(ω), X(ω), and Y(ω)) for each frequency (or frequency band) co. Stage 38 rotates the input WXY data to generate rotated audio data E1, E2, and E3, and metadata K indicative of the rotation performed. Assuming a frequency domain representation of the WXY data having components (W(ω), X(ω), and Y(ω)) for each frequency (or frequency band) ω, the rotated audio data has a frequency domain representation comprising components, E1(ω), E2(ω), and E3(ω), for each frequency (or frequency band) ω, and the metadata K comprises components K(ω), for each frequency (or frequency band) ω. The rotation is performed such that the component E1 (i.e., the components E1(ω), in the frequency domain representation) are indicative of sound uttered by a dominant participant (talker) in the conference, and the position (i.e., azimuthal angle) of the dominant participant relative to the position of the capturing microphone array is determined by the metadata K.

In typical embodiments, neither the mono channel determined by stage 36 nor the E1 component determined by stage 38 is derived as a static mixdown of captured channels, but rather is a signal component which has been adaptively extracted from a multichannel captured signal, and is preferably both suited to mono use and constrained in 'steering' to be perceptually plausible. The monophonic layer is typically extracted from the spatially layered encoded signal in such a way as to allow pre-processing (e.g., noise suppression) to be applied efficiently thereto to make it more suitable for use in monaural presentation (e.g., audio data indicative of the monophonic layer's content is extracted with metadata indicative of pre-processing to be performed on the audio data). The pre-processing application is typically not simply a change in signal-to-noise ratio, but rather is a perceptually guided continuous time frequency masking to highlight a voice of interest, achieving leveling, noise removal and reverb reduction collectively or in any combination.

Coding and packing stage 52 is configured to generate "Th" metadata (of the above-described type) in response to the parameters 40, and to assert this metadata in an appropriate segment (segment 63) of each block (60) of the spatially layered encoded audio generated by the FIG. 2 system. In one implementation, stage 52 (and each of below-described stages 54 and 56) is configured to transform into the frequency domain the data asserted to its input(s), and to organize the resulting frequency-domain data into a serial bitstream for packing into the appropriate segment of each block of the spatially layered encoded audio.

Coding and packing stage 54 is configured to generate the above-described "g" metadata in response to all or some of the above-noted $g_{level}$, $g_{mono}$, and $g_{spatial}$ metadata generated in stages 50, 46, and 48, and to assert this "g" metadata in an appropriate segment (segment 62) of each block (60) of the spatially layered encoded audio generated by the FIG. 2 system. Typically, the "g" metadata output from stage 54 is indicative of the gain profile that could have been applied to E1 (or M) at the capture point to improve the signal for mono delivery, and thus should be applied to E1 (or M) at the endpoint to improve the signal as rendered at the endpoint. This gain profile typically implements noise reduction and reverb reduction (as indicated by $g_{mono}$), and levelling (as indicated by $g_{level}$). The metadata "g" may be a gain profile (e.g., a time-variable gain profile) comprising at least one frequency-variable component which when applied to at least one (e.g., to all) of signals E1, E2, and E3 (or at least one signal derived therefrom), attenuates non-voice content (e.g. noise, sibilance and/or reverb).

By applying the gain profile to such signal(s), new signals may be obtained which may be more suitable for audio playback at an output endpoint (e.g. resulting in a more desirable listening experience) or for combining audio channels from different sources (e.g. in a server or mixer in a teleconferencing system).

The gain profile may be time-variable in that it may be different for different time instants/time frames. The frequency-variable component comprised in g is frequency variable in that it may correspond to different gains (or amounts of attenuation) to be applied to different frequency components/bands of signals on which the gain profile is applied.

The frequency-variable component may be adapted to attenuate non-voice content in audio signals, such as noise content, sibilance content and/or reverb content (e.g., it may clean frequency content/components that are expected to convey sound other than speech or apply some frequency and time varying filter that may have otherwise been applied at the time of the input audio processing to arrive at a desired output for a particular purpose). The gain profile may comprise separate sub-components for these different functional aspects. For example, the gain profile may comprise frequency-variable components from the group comprising: a noise gain for attenuating noise content, a sibilance gain for attenuating sibilance content, and a reverb gain for attenuating reverb content.

The gain profile may comprise frequency-variable components adapted for different playback modes, such as monophonic playback or soundfield playback. For example, the gain profile may comprise a mono gain adapted to attenuate non-voice content in a single channel audio signal (e.g., a rotated audio signal E1 that has been generated in stage 38) in order to make the resulting attenuated version of the single channel audio signal better adapted for monophonic playback (e.g., attenuating such types of non-voice components that may be particularly bad for achieving a good monophonic listening experience).

Alternatively, or additionally, the gain profile may comprise a spatial gain (or soundfield gain) adapted to attenuate non-voice content in a multi-channel audio signal (e.g., rotated audio signals E1, E2, E3 that have been generated in stage 38) in order to make the resulting attenuated version of the rotated audio signals better adapted for spatial (or soundfield) playback (e.g. attenuating such types of non-voice components that may be particularly bad for achieving a good spatial listening experience).

The gain profile may comprise a time-variable broadband gain may implement aspects of dynamic range control, such as leveling, or phrasing in accordance with utterances, and may comprise time-variable broadband gain components, such as a voice activity gain for performing phrasing and/or voice activity gating and/or a level gain for adapting the loudness/level of the signals (e.g., to achieve a common level for different signals, for example when forming a combined audio signal from several different audio signals with different loudness/level).

Coding and packing stage 56 is coupled and configured to receive the E1, E2, E3, and K values generated in stage 38, to assert the E1 data (or a transformed version of the E1 data) in an appropriate segment (segment 61) of each block (60) of the spatially layered encoded audio generated by the FIG. 2 system, and to assert the E2 E3 K data (or a transformed version thereof) in an appropriate segment (segment 64) of each block (60) of the spatially layered encoded audio generated by the FIG. 2 system.

In variations on the FIG. 2 system, the inventive encoder is also operable to transmit the input audio data, WXY, or a cleaned and leveled version of the input audio data WXY, in place of (or in addition to) the rotated "E1 E2 E3 K" soundfield data. In the case that a cleaned and leveled version of the input audio data WXY is transmitted, the "g" metadata (output from stage 54, or a similar metadata generation stage) would typically be indicative of the gain profile that could have been applied to the WXY data at the capture point to improve the signal for soundfield delivery, and thus should be applied to the WXY data at the endpoint to improve the signal as rendered at the endpoint. This gain profile typically implements noise reduction and reverb reduction (as indicated by $g_{spatial}$ of FIG. 2) and levelling (as indicated by $g_{level}$ of FIG. 2).

In typical embodiments, the spatially layered encoded audio generated by the FIG. 2 system is transmitted (to a server, or to at least one endpoint) as a serial bitstream comprising a sequence of packets (blocks) 60 of bits. Discarding of layers is implemented simply by truncating each packet (e.g., to eliminate the bits in segment 64, or segments 63 and 64, of packet 60).

Consider an example in which each packet 60 consists of one hundred bytes of encoded audio data: the first 40 bytes (in segment 61) are the E1 audio data; the next 10 bytes (in segment 62) are the "g" metadata; the next 5 bytes (in segment 63) are the "Th" metadata; the next 20 bytes (in segment 64) are the E2 information; the next 20 bytes (also in segment 64) are the E3 information, and the last 5 bytes (also in segment 64) are the "K" metadata. By simply omitting the last 45 bytes when the packet is forwarded by a server, the downstream client receives only the following data: E1 (40 bytes), g (10 bytes), and Th (5 bytes). A stream comprising such truncated packets (each comprising 55 bytes) has monophonic layer (the E1 bits, or the E1 and "g" bits considered together) with a gain profile (determined by the "g" bits) and a soundfield layer (the "K" bits) indicative of a direction of arrival of the audio determined by the E1 bits. Monophonic layer E1 (or "E1 g") with layer Th, when decoded, are indicative of a soundfield audio signal.

In typical embodiments, a decoder recognizes the start, end, and format of each packet of a bitstream of spatially layered encoded audio (generated in accordance with an embodiment of the invention) as follows. The length of the packet is contained within a header (e.g., the Internet Protocol header) of the bitstream which encapsulates the packet. The encapsulating protocol (e.g., the UDP/IP protocol) provides payload length information. For example, the decoder might call the standard Berkeley Sockets recvfrom( ) function (available on virtually all operating systems) which returns: payload, payload length, source IP address, and source port.

We next consider several schemes for determining which encoding layer(s) should be used to encode an audio stream in accordance with the invention under various conditions. It is assumed in the following discussion that feedback mechanisms (e.g., those mentioned above) are optionally applied when appropriate to achieve desired (e.g., ideal) layering. However, the following discussion is still applicable if an embodiment of the invention does not employ feedback, and instead always has each endpoint or server transmit the maximum amount of information that it is capable of generating.

In the first scheme (to be referred to as "downstream capability driven layer selection"), the desired transmission layer for each upstream link is bounded by the capabilities of the downstream devices. For example, when the layer selection is performed by a server (e.g., server 2 of FIG. 1) which mixes (e.g., in stage 4 of server 2) streams (which have been transmitted upstream to the server) on behalf of (i.e., for transmission to) at least one downstream endpoint, the server may select (for mixing, e.g., in stage 4 of FIG. 1) from each upstream transmission to be mixed, the layer (i.e., soundfield or monophonic layer) which corresponds to a maximal rendering capability of the at least one downstream endpoint. For example, when the server receives audio which has undergone spatially layered encoding in an endpoint, and has then been sent upstream to the server from the endpoint, the server requires only the layer of the encoded audio which can be used by the most capable endpoint which is to receive content determined by the audio.

For example, in a conference containing one soundfield endpoint (which is configured to transmit spatially layered encoded audio comprising layers E1, "E1 g," "E1 Th," "E1 E2 E3 K," and/or "E1 g Th E2 E3 K") and two monophonic endpoints (e.g., two traditional monophonic telephones), the server (e.g., server 2 of FIG. 1) requires only layer E1 g from the soundfield endpoint in order to create the downstreams for the two monophonic endpoints. If one of the optional feedback mechanisms described above is in use, the server can request that the soundfield endpoint send only layer E1 g, thereby minimizing upstream bandwidth. If no feedback mechanism is in use, the soundfield endpoint may simply send upstream encoded audio layers indicative of a full "E1 g Th E2 E3 K" soundfield and the server will discard all information above the E1 g layer when mixing audio content from the soundfield endpoint.

It is also useful to consider downstream capability driven layer selection in the subcase in which the server (e.g., server 2 of FIG. 1) does not mix the upstreams (the streams which have been transmitted upstream to said server), but instead forwards the encoded streams (or layer(s) thereof) directly to downstream endpoints (e.g., for mixing). When forwarding encoded audio streams, the server (e.g., server 2 of FIG. 1) selects from each upstream transmission a subset of the layers (of the streams) which corresponds to the capabilities of each downstream node (endpoint) to receive content from each upstream transmission, and forwards only the selected subset of layers to each relevant endpoint. Additional information (i.e., higher level layers) can be removed by the server (and not forwarded) to save downstream bandwidth. Consider again the example given above which assumes one soundfield endpoint and two traditional monophonic telephones. When forwarding the downstream for monophonic telephone A, the server may forward to the monophonic telephones only the E1 g portion of the E1 g Th E1 E2 K stream received from the soundfield endpoint, and may also forward the E1 g stream received from monophonic telephone B.

The second scheme employed in some embodiments of the invention is referred to herein as perceptually driven layer selection. In this scheme, the server (e.g., server 2 of FIG. 1) implements a mixing strategy (e.g., a sophisticated mixing strategy) having a goal of producing a perceptually continuous teleconferencing listening experience at each endpoint while minimizing upstream and downstream bandwidth.

When considering how to mix a soundfield (which has been sent upstream from a first endpoint to a server) using perceptually driven layer selection, for listening by a soundfield endpoint (e.g., headphone virtualized or speaker array) downstream, the server may consider heuristics of the first endpoint such as one or more of the following:

1. how likely the stream is to be spatially, temporally or spectrally masked by other streams,
2. whether the stream currently contains speech,
3. the conversational role that the current talker is playing within the conversation,
4. the rate of false voice activity detection in the stream
5. how pleasant, natural or annoying is ambient noise in the soundfield, and
6. overall noise level of the conference.

In embodiments of the inventive method employing perceptually driven layer selection a server (e.g., server 2 of FIG. 1) may implement mixing (or forwarding) decisions based on these heuristics. Examples of such decisions are:

the full E1 g Th E1 E2 K representation of an endpoint's upstream transmission should be heard by all other soundfield endpoints because a prevalent participant in the conference is currently talking at that endpoint;

the upmixed E1 g Th representation of an endpoint's upstream transmission should be heard by all other soundfield endpoints because ambient noise at that endpoint is likely to be particularly annoying. Only the voice of a person talking at that endpoint is desired (not ambient noise that would be indicated by a full set of E1, E2, and E3 data);

the upmixed E1 g Th representation of an endpoint's upstream transmission should be heard by all other soundfield endpoints because this endpoint is interjecting over the top of a soundfield endpoint at which a person has been talking for some time and it is desired not to interrupt the perceptual flow of the soundfield endpoint currently holding the floor; and the upmixed E1 g Th representation of an endpoint's upstream transmission should be heard by all other soundfield endpoints because this endpoint is constantly flagging very short bursts of falsely-detected speech and it is desired not to allow the sound falsely detected as speech (which would be indicated by a full set of E1, E2, and E3 data) to interrupt the perceptual flow of the soundfield endpoint currently holding the floor.

Perceptually driven layer selection may be implemented at a server (e.g., server 2 of FIG. 1) by deciding which layers the server should decode, mix and re-encode. Alternatively, it may be implemented at a client by arranging for the server to selectively forward the appropriate information downstream with metadata instructing the downstream endpoints on how to mix the forwarded streams. An embodiment of the inventive method or system may dynamically switch over time from server-based to client-based mixing on a per-call, per-endpoint basis as server load and bandwidth conditions vary.

Perceptually driven selection of layers in the encoded audio to be forwarded (or transmitted upstream) may not be based on downstream capability (e.g., the capability of each endpoint to utilize layers of forwarded audio) or bandwidth considerations, but instead on a requirement of perceptual presence of audio content (e.g., audio uttered by a specific source, or another specific type of audio, captured by a client) in a designed mix for a particular endpoint (e.g., output client). For example, a server may implement at least one of mixing and forwarding of spatially layered encoded audio (in performance of a method implementing perceptually driven layer selection), such that the mixing and/or forwarding implements at least one decision based on a requirement of perceptual presence of audio content at at least one endpoint.

As an example of perceptually driven layer selection, consider the case that there is one soundfield endpoint, and that all other endpoints are monophonic endpoints (e.g., PSTN telephones). In this example, the server will only need to forward (to the monophonic endpoints) a monophonic layer (e.g., E1 g) of the spatially layered encoded audio generated by the soundfield endpoint. So, the decision may be made to send only this monophonic layer from the soundfield endpoint to the server, and this decision is not based on bandwidth, but is instead based on the maximal capability required by the monophonic endpoints.

For another example, consider an endpoint (i.e., a conference participant at the endpoint) which does not speak often and therefore is unlikely to be a dominant participant in a conference. This same spatial endpoint will typically see significant voice traffic coming back into it. In this case, a decision may be made for the endpoint to only send only "E1 g Th" layers upstream to a server, since the soundfield audio from this endpoint is unlikely to be used in any rendered output scene.

The third layer selection scheme used in some embodiments of the invention is referred to herein as bandwidth-driven layer selection. This selection scheme has as its target the maintenance of a particular upstream bandwidth, downstream bandwidth, or overall bandwidth, in a call or across an entire teleconferencing system servicing many simultaneous calls. As more endpoints join, the spatial fidelity of the endpoints as heard by other endpoints is preferably decreased in a desirable manner. In some embodiments, graceful spatial fidelity degradation is implemented using conversational dynamic heuristics so that the endpoints least important in a conference are heard to degrade first.

The fourth layer selection scheme used in some embodiments of the invention will be referred to herein as endpoint-driven layer selection. In this scheme, at least one endpoint makes independent decisions as to what layer(s) of information to include in an encoded audio signal to be sent upstream based on heuristics local to the endpoint (where "heuristics" local to the endpoint denotes in this context at least one analyzed characteristic of the endpoint or of audio content captured by the endpoint). For example the decisions may be based on one or more of the following heuristics:

1. whether the stream to be encoded currently contains speech,
2. the talk rate of the endpoint,
3. the rate of false voice activity detection at the endpoint,
4. how pleasant, natural or annoying is the ambient noise in the soundfield, and
5. overall noise level at the endpoint.

All four of the above-described layer selection schemes apply to a client/server architecture. A fifth layer selection scheme implemented in some embodiments of the invention is referred to herein as peer-to-peer layer selection and it is applicable only in the peer-to-peer case (in which the inventive system does not use or include a server). At call setup time, the endpoints (which are peers) exchange information among each other. Then, during the teleconference, each peer transmits all layers up to a selected maximum layer which is appropriate to its own audio capture capability and each other peer's rendering capability. For example, a soundfield endpoint communicating with a traditional monophonic telephone may choose to send to the monophonic telephone only the E1 g layer because it knows that its monophonic peer can make no use of the additional Th E1 E2 K information.

An embodiment of the invention may combine the layer selection schemes mentioned here to achieve an overall layer selection scheme.

In summary, typical embodiments of the invention are teleconferencing methods and systems in which endpoints implement spatially layered spatial audio coding, including by implementing at least one (e.g., more than one) of the following layer selection schemes individually or in combination:

a. downstream capability-driven layer selection;
b. perceptually-driven layer selection;
c. bandwidth-driven layer selection;
d. endpoint-driven layer selection; and
e. peer-to-peer layer selection.

Given that different embodiments of such a method or system may make layer selection decisions at various points (e.g., in a server or at endpoints), the selection of layers may be implemented by all or some of:

a. discarding layers when redundant spatial information has been received,
b. sending feedback causing another element of the system to switch to a lower coding layer when redundant spatial information has been received, and
c. sending feedback causing another element of the system to switch to a higher coding layer when insufficient spatial information has been received.

A class of embodiments of the invention is a teleconferencing method which provides (and a teleconferencing system configured to provide) an encoded audio stream including a mix (e.g., a perceptually pleasant mix) of soundfield and monophonic layers to endpoints (e.g., a mix of soundfield and/or monophonic layers which varies over time in a continuous manner). In some embodiments in this class, the server and endpoints work together to implement all or some of the strategies outlined below.

Each of the participants in a teleconference (comprising audio captured at each endpoint) is classified (by an endpoint or by the server) as being in one of the following states:

Presenting—i.e., the participant is the dominant talker (e.g., a participant who has talked continuously for at least a minute);
Conversing—i.e., a participant engaged in an interchange with at least one other participant (e.g., so that the dominant talker changes at least every 30 seconds);
Interjecting—a participant who begins to talk while a presenting participant is talking (e.g., speech uttered by the interjecting participant may have duration of less than 30 seconds); and
Idle—a participant who has not talked recently.

Ambient noise (indicated by audio captured at each endpoint) is also classified (e.g., at each endpoint or by the server) as being one of: benign; annoying; and pathological.

Given such heuristics, the system implements a predetermined set of rules which determine how noise is processed and encoding layers are selected. The rules determine an operating mode of the system for processing (including by encoding) each audio signal segment to be sent upstream or downstream. In some embodiments, the selected set of layers (e.g., selected subset of a full set of layers) varies over time in a manner determined by application of a predetermined set of rules, where the rules relate subsets of the set of a full set of encoding layers to analyzed characteristics of at least one of the endpoints of a teleconferencing system or of audio content captured or transmitted by said at least one of the endpoints.

Typically, such rules can be expressed as a table which determines how noise is processed and encoding layers are selected (e.g., for mixing or forwarding). An example of such a table is Table 1:

TABLE 1

| Participant state | Endpoint noise | Mixing Strategy |
|---|---|---|
| idle | don't care | mute |
| presenting | benign | mix E1 g Th E2 E3 K |
| presenting | annoying | mix E1 g Th E2 E3 K |
| presenting | pathological | mix E1 g Th |
| conversing | benign | mix E1 g Th E2 E3 K |
| conversing | annoying | mix E1 g Th |
| conversing | pathological | mix E1 g Th |
| interjecting | don't care | mix E1 g Th |

In Table 1, the "mixing strategy" implemented by the server is such that the server includes, in the mix transmitted to all endpoints (e.g., the mix determined by stage 4 of server 2 of FIG. 1 in response to streams of encoded audio transmitted from the system's endpoints), the layer(s) indicated in the table from each endpoint whose audio stream is indicative of the indicated participant state and endpoint noise state. For example, the server includes in the mix the layers E1 g Th E2 E3 K of the audio from an endpoint, in response to determining (e.g., from data values included in the encoded audio received from the endpoint, or by processing the encoded audio received from the endpoint) that the audio is indicative of utterances of a "presenting" conference participant and is also indicative of "benign" (or "annoying") noise. The entry "mute" in the "mixing strategy" column of the table indicates that the server does not include in the mix an audio stream indicative only of an idle participant (or idle participants).

Aspects of the present invention are methods for classifying the state of each endpoint (e.g., each state determined by a participant state and endpoint noise category for an endpoint), and descriptions of rules (e.g., tables which determine rules) for implementing mixing (or other processing) and/or transmission of spatially layered encoded audio data determined by such state classification.

In one embodiment, a voice server product (for use in a system including at least one client endpoint) is configured to implement a simple feedback path from the server to each client to instruct the client to only send monophonic (e.g., "E1 g") layers if the server determines that no other endpoint (no endpoint other than the endpoint which receives the instruction) which is soundfield-capable is part of a call. For example, if a first endpoint is a phone system including a soundfield microphone array, and all the other endpoints are conventional (monophonic) phones connected over the PSTN, the server instructs the first endpoint to revert to mono (i.e., to send only a monophonic layer of encoded audio) to save upstream bandwidth, since the other endpoints will make use of only monophonic audio information.

In some embodiments, a server can discard unnecessary layers of spatially layered encoded audio information when mixing or forwarding a stream of such encoded audio. In some embodiments, a server can send feedback to a client to cause it to stop sending unnecessary layers (or, conversely, instruct it to send more layers) of spatially layered encoded audio information.

In some embodiments, spatially layered encoding implemented in accordance with the invention does not merely provide a simple layered (e.g., hierarchically layered) audio data format. Instead, it also includes metadata indicating differing amounts of pre-processing such as leveling, noise reduction and gating to be applied to each layer (or to each of at least one of the audio data layers). The transform or migration between the processing of different coding layers is preferably a very low cost operation, preferably with no requirement for parsing or recoding. As an example, consider a soundfield endpoint (e.g., telephone system with a microphone array and a pair of headphones) configured to render sound with full spatial fidelity, a wide dynamic range and room ambience. Consider also a monophonic endpoint (telephone or PSTN receiver) which needs a highly compressed and conditioned component signal and mix. Typical embodiments of the inventive method for selecting layers of spatially layered audio coding allow both such endpoints to operate per their full capabilities, in addition to providing bandwidth efficiency. Preferably, the method utilizes a full range of required signals (e.g., from cleaned monophonic audio through to full soundfield encoded audio) in a way that allows for selective access and low complexity forwarding of the different signal components (layers) to match a receiver's capabilities, while making efficient use of all signals to reduce the encoded size (volume) of the transmitted data.

In a class of embodiments, the inventive voice conferencing system is an end to end solution for voice conferencing that utilizes an IP network for the data connections required across the system. The system supports creating an improved user experience through the utilization of multichannel spatial audio encoding where available to increase voice intelligibility and the plausible listening experience of a conference.

Some embodiments of the inventive system implement multichannel spatial capture of a soundfield at an appropriately configured endpoint, send cleaned and discontinuous voice segments across the system, and the server of the system combines them to achieve the required auditory scene at an endpoint. As much as possible, the server aggregates and forwards data, while avoiding decoding and mixing operations as much as possible. Captured mono streams can be rendered using positional information imparted by the server.

Multichannel soundfield capture (using a microphone array) of sound uttered by one or more active conference participants typically allows a greater perceptual fidelity and naturalness of listening than monophonic capture by a single microphone. Captured audio is presented to the listener in accordance with typical embodiments of the invention in a way that is consistent with what might be experienced in a plausible acoustic environment, and this allows intermediate and high levels of binaural and spatial processing in the brain to assist in following the voice conference activity. The signals that are captured may be continuous, higher fidelity, less processed at the point of capture, multichannel and are typically a composite of sound from multiple sources. This is in contrast to a conventional system, in which efforts are taken at the capture point to create a single object or voice capture that is cleaned (noise removal) and broken into segments of activity.

Aspects of the invention include a system or device configured (e.g., programmed) to perform any embodiment of the inventive method, and a computer readable medium (e.g., a disc) which stores code for implementing any embodiment of the inventive method or steps thereof. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and a processing subsystem that is programmed (and/or otherwise configured) to perform an embodiment of the inventive method (or steps thereof) in response to data asserted thereto.

The FIG. 2 system (or processor 5, 10 or 20 or server 2 of the FIG. 1 system) may be implemented as a configurable (e.g., programmable) digital signal processor (DSP) that is configured (e.g., programmed and otherwise configured) to perform required processing on an audio signal, including performance of an embodiment of the inventive method. Alternatively, the FIG. 2 system (or processor 5, 10 or 20 or server 2 of the FIG. 1 system) may be implemented as a programmable general purpose processor (e.g., a PC or other computer system or microprocessor, which may include an input device and a memory) which is programmed with software or firmware and/or otherwise configured to perform any of a variety of operations including an embodiment of the inventive method. A general purpose processor configured to perform an embodiment of the inventive method would typically be coupled to an input device (e.g., a mouse and/or a keyboard), a memory, and a display device.

Another aspect of the invention is a computer readable medium (e.g., a disc) which stores code for implementing any embodiment of the inventive method or steps thereof.

While specific embodiments of the present invention and applications of the invention have been described herein, it will be apparent to those of ordinary skill in the art that many variations on the embodiments and applications described herein are possible without departing from the scope of the invention described and claimed herein. For example, examples mentioned herein of time and/or frequency domain processing (and/or time-to-frequency transformation) of signals are intended as examples and are not intended to limit the claims to require any specific type of processing and/or transformation that is not explicit in the claims. It should be understood that while certain forms of the invention have been shown and described, the invention is not to be limited to the specific embodiments described and shown or the specific methods described.

What is claimed is:

1. A teleconferencing method in which nodes perform audio coding to generate spatially layered encoded audio, the nodes include endpoints, and at least some of the spatially layered encoded audio is transmitted from one of the nodes to at least another one of the nodes, wherein the nodes include a first node which is configured to generate spatially layered encoded audio in response to soundfield audio data, said encoded audio including any of a number of different subsets of a set of layers, said set of layers including at least one monophonic layer and at least one soundfield layer, said method including steps of:
   (a) in the first node, determining a first subset of the set of layers by performing at least one of perceptually-driven layer selection or endpoint-driven layer selection, said first subset including at least one of said monophonic layer or said soundfield layer, wherein said endpoint-driven layer selection includes at least one independent decision by at least one of the endpoints based on at least one analyzed characteristic of said at least one of the endpoints or of audio content captured by said at least one of the endpoints, and wherein said perceptually-driven layer selection is not based on any downstream capability consideration; and
   (b) in said first node, generating first spatially layered encoded audio, wherein the first spatially layered encoded audio includes the first subset of the set of layers determined in step (a), and wherein the first spatially layered encoded audio does not include any layer of said set of layers which is not included in said first subset of the set of layers determined in step (a).

2. The method of claim 1, wherein each of the endpoints is a telephone system, and step (a) is performed in one of the endpoints.

3. The method of claim 1, wherein the nodes include at least one server, and step (a) is performed in the server.

4. The method of claim 1, wherein the set of layers also includes at least one metadata layer comprising metadata indicative of at least one processing operation to be performed on the encoded audio, and wherein the first subset determined in step (a) includes at least one said metadata layer.

5. The method of claim 1, wherein the nodes include at least one monophonic endpoint, at least one soundfield endpoint, and at least one server, step (b) is performed in one said soundfield endpoint, and said method also includes a step of transmitting the first spatially layered encoded audio to at least one of the server and one said monophonic endpoint.

6. The method of claim 1, wherein step (a) includes selecting said first subset of the set of layers from a spatially layered encoded audio signal, but not selecting any layer of the spatially layered encoded audio signal which is not included in said first subset.

7. The method of claim 6, wherein the nodes include at least one monophonic endpoint, at least one soundfield endpoint, and at least one server, and step (a) includes selecting said first subset of the set of layers, but not any layer of the spatially layered encoded audio signal which is not included in said first subset, for processing in one said monophonic endpoint.

8. A teleconferencing system, including:
   nodes configured to perform audio coding to generate spatially layered encoded audio, wherein the nodes include endpoints, and each of the nodes is coupled to at least one other one of the nodes and configured to transmit at least some of the spatially layered encoded audio to said at least one other one of the nodes, and wherein the nodes include a first node configured to generate spatially layered encoded audio in response to soundfield audio data, said encoded audio including any of a number of different subsets of a set of layers, said set of layers including at least one monophonic layer and at least one soundfield layer, and wherein the first node is configured to determine a first subset of the set of layers by performing at least one of perceptually-driven layer selection or endpoint-driven layer selection, said first subset including at least one of said monophonic layer or said soundfield layer, wherein said endpoint-driven layer selection includes at least one independent decision by at least one of the endpoints based on at least one analyzed characteristic of said at least one of the endpoints or of audio content captured by said at least one of the endpoints, and wherein said perceptually-driven layer selection is not based on any downstream capability consideration, and wherein said first node is configured to generate first spatially layered encoded audio, wherein the first spatially layered encoded audio includes the first subset of the set of layers determined by said first node, and wherein the first spatially layered encoded audio does not include any layer of said set of layers which is not included in said first subset of the set of layers determined by said first node.

9. The system of claim 8, wherein each of the endpoints is a telephone system, and the first node is one of the endpoints.

10. The system of claim 8, wherein the nodes include endpoints and at least one server, and the first node is the server.

11. The system of claim 8, wherein the set of layers also includes at least one metadata layer comprising metadata indicative of at least one processing operation to be performed on the encoded audio, and the first subset determined by the first node includes at least one said metadata layer.

12. The system of claim 8, wherein the nodes include at least one monophonic endpoint, at least one soundfield endpoint, and at least one server, the first node is one said soundfield endpoint, and the first node is coupled and configured to transmit the first spatially layered encoded audio to at least one of the server and one said monophonic endpoint.

13. The system of claim 8, the first node is configured to select said first subset of the set of layers from a spatially layered encoded audio signal, without selecting any layer of the spatially layered encoded audio signal which is not included in said first subset.

14. The system of claim 13, wherein the nodes include at least one monophonic endpoint, at least one soundfield endpoint, and at least one server, and the first node is configured to select said first subset of the set of layers, but not any layer of the spatially layered encoded audio signal which is not included in said first subset, for processing in one said monophonic endpoint.

15. The system of claim 13, wherein the nodes include at least one monophonic endpoint, at least one soundfield endpoint, and at least one server, and the first node is the server.

* * * * *